(12) United States Patent
Kamath et al.

(10) Patent No.: US 10,152,634 B2
(45) Date of Patent: Dec. 11, 2018

(54) METHODS AND SYSTEMS FOR CONTEXTUALLY PROCESSING IMAGERY

(71) Applicant: Digimarc Corporation, Beaverton, OR (US)

(72) Inventors: Ajith M. Kamath, Beaverton, OR (US); Kurt M. Eaton, West Linn, OR (US)

(73) Assignee: Digimarc Corporation, Beaverton, OR (US)

( * ) Notice: Subject to any disclaimer, the term of this patent is extended or adjusted under 35 U.S.C. 154(b) by 162 days.

(21) Appl. No.: 15/146,663

(22) Filed: May 4, 2016

(65) Prior Publication Data
US 2016/0321502 A1 Nov. 3, 2016

Related U.S. Application Data

(63) Continuation-in-part of application No. PCT/US2014/066616, filed on Nov. 20, 2014.
(Continued)

(51) Int. Cl.
*G06K 9/00* (2006.01)
*G06Q 30/00* (2012.01)
(Continued)

(52) U.S. Cl.
CPC ........ *G06K 9/00624* (2013.01); *G01B 11/272* (2013.01); *G06K 7/1456* (2013.01); *G06K 9/2036* (2013.01); *G06K 9/4661* (2013.01); *G06K 9/78* (2013.01); *G06Q 30/00* (2013.01); *G06T 7/73* (2017.01); *G07G 1/0045* (2013.01); *H04M 1/0264* (2013.01); *H04N 5/2256* (2013.01); *H04N 21/23418* (2013.01); *H04N 21/254* (2013.01); *H04N 21/2665* (2013.01);
(Continued)

(58) Field of Classification Search
CPC ......... G06K 9/00624; G06K 9/78; G06T 7/73
See application file for complete search history.

(56) References Cited

U.S. PATENT DOCUMENTS 4,760,269 A * 7/1988 McKenna ............... G01S 17/48
250/559.08
5,468,950 A 11/1995 Hanson
(Continued)

FOREIGN PATENT DOCUMENTS

WO WO2013140296 9/2013
WO WO2015077455 5/2015

OTHER PUBLICATIONS

Garcia, et al. Chromatic Aberration and Depth Extraction, Proc. IEEE 15th Int'l Conf on Pattern Recognition, 2000.
(Continued)

*Primary Examiner* — Nam D Pham
(74) *Attorney, Agent, or Firm* — Digimarc Corporation

(57) ABSTRACT

Arrangements are detailed to process imagery of an object, captured by a camera, based on contextual data that at least partially characterizes a condition of the object when the imagery was captured. Contextual data can be obtained directly by a sensor or can be derived by pre-processing the captured imagery. The captured imagery can be processed to detect features such as digital watermarks, fingerprints, barcodes, etc. A great number of other features and arrangements are also detailed.

23 Claims, 6 Drawing Sheets

Related U.S. Application Data

(60) Provisional application No. 61/908,309, filed on Nov. 25, 2013.

(51) Int. Cl.

| | | |
|---|---|---|
| *H04N 21/234* | (2011.01) | |
| *H04N 21/254* | (2011.01) | |
| *H04N 21/2665* | (2011.01) | |
| *H04N 21/8358* | (2011.01) | |
| *G01B 11/27* | (2006.01) | |
| *G06K 7/14* | (2006.01) | |
| *G06K 9/20* | (2006.01) | |
| *G06K 9/46* | (2006.01) | |
| *G06K 9/78* | (2006.01) | |
| *G07G 1/00* | (2006.01) | |
| *H04M 1/02* | (2006.01) | |
| *H04N 5/225* | (2006.01) | |
| *G06T 7/73* | (2017.01) | |

(52) U.S. Cl.
CPC ............... *H04N 21/8358* (2013.01); *G06T 2207/10004* (2013.01); *G06T 2207/10152* (2013.01); *G06T 2207/30204* (2013.01)

(56) References Cited

U.S. PATENT DOCUMENTS

| | | |
|---|---|---|
| 5,534,924 A | 7/1996 | Florant |
| 8,035,823 B2 | 10/2011 | Keightley et al. |
| 8,107,721 B2 | 1/2012 | Beardsley et al. |
| 8,165,403 B1 | 4/2012 | Ramalingam et al. |
| 8,773,508 B2 | 7/2014 | Daniel et al. |
| 8,908,918 B2 | 12/2014 | Daon et al. |
| 2006/0171041 A1 | 8/2006 | Olmstead et al. |
| 2007/0228175 A1 | 10/2007 | Kotlarsky et al. |
| 2008/0142597 A1 | 6/2008 | Joseph et al. |
| 2008/0251585 A1 | 10/2008 | Silverbrook et al. |
| 2013/0048722 A1 | 2/2013 | Davis et al. |

OTHER PUBLICATIONS

Strike a Pose, 3D Vision, Imaging and Machine Vision Europe, 2010.
PCT Search Report and Written Opinion dated Feb. 27, 2015 in PCT/US2014/066616.
Carolina Galleguillos et al. 'Context Based Object Categorization: A Critical Survey', In: Computer Vision and Image Understanding, Mar. 1, 2010, vol. 114, Issue 6, pp. 712-722.

\* cited by examiner

METHODS AND SYSTEMS FOR CONTEXTUALLY PROCESSING IMAGERY

RELATED APPLICATION DATA

This application is a continuation-in-part of PCT application PCT/US2014/066616, filed Nov. 20, 2014 (published as WO2015077455), which claims priority to provisional application 61/908,309, filed Nov. 25, 2013. These prior applications are incorporated herein by reference.

TECHNICAL FIELD

This disclosure relates generally to image processing. More particularly, this disclosure relates to image processing activities used in conjunction with data signal detection, image recognition, three-dimensional scanning, augmented reality, etc.

BACKGROUND AND SUMMARY

Advances in image processing technologies have created many new and useful ways to identify tangible or otherwise visible objects (e.g., newspapers, magazine pages, posters, product packaging, consumer products, labels, event tickets, credit cards, paper currency, electronic device housings, displayed video or still imagery, etc.) in support of a wide variety of applications relating to advertising, augmented reality, content identification, copyright control, digital rights management, e-commerce, gaming, image-based search, social tagging, security, etc. In a typical scenario, an object identification process is initiated by first capturing an image of a surface of the object. The captured image is then subjected to one or more feature detection processes to discern between a signal representing a specific information-bearing feature (e.g., that can be used to identify the object) within the captured image and other features or information visually conveyed by the object. As used herein, a "feature" generally represents a robust image characteristic of the type that can be inserted in the visual information already conveyed by the object (e.g., via use of a one- or two-dimensional barcode, digital watermark, dataglyph, etc.), or an image characteristic that can be otherwise identified within the visual information already conveyed by the object (e.g., via use of known fingerprinting techniques), or a combination of both.

In some cases, the accuracy or reliability of a feature detection process depends on the pose of the surface of the object being imaged relative to the device used to capture the image of the object. In this context, "pose" can refer to one or more attributes such as distance between the object being imaged and the device capturing the image (also referred to as "scale") and tilt of the object being imaged relative to an image plane of the device capturing the image (also referred to as "shear" or "differential scale"). Hence, proper alignment of the object surface being imaged with a camera-equipped electronic device is important to ensure that a feature is accurately and reliably detected.

Some conventional feature detection processes have been developed that are invariant to one or more of the aforementioned pose attributes (e.g., as with Scale-Invariant Feature Transform—SIFT, or Speeded Up Robust Features—SURF, etc.), but these processes can be undesirably time-consuming or require an excessive amount of processing resources. Other conventional feature detection processes iteratively perform one or more operations, with each operation using one or more parameters optimized for a specific pose or range of poses, until an acceptable result obtained. While such iterative processes can be less computationally expensive than pose-invariant processes, these processes are still undesirably slow for certain applications (e.g., involving rapid scanning of multiple objects over a short period of time).

Accordingly, it would be desirable to perform feature detection processes in a manner that is both faster than conventional iterative processes and requires less computational resources than typical pose-invariant detection processes.

Still other approaches seek to establish the pose of an object surface by using various 3D modeling techniques. For example, depth sensing cameras can be used to assess the distance from the camera to each of multiple points on the object surface, to thereby determine the pose of the object relative to the camera. One such camera is Microsoft's Kinect system (which is understood to employ technology developed by PrimeSense that is detailed, e.g., in published patent applications 20100020078 and 20100118123). The Kinect system projects a speckle pattern of infrared laser light into a scene, and captures imagery showing the pattern as projected onto the surface(s) in the scene. This imagery is analyzed to discern deformation of the projected pattern and deduce, from such deformation (e.g., by techniques such as depth from stereo and depth from focus), the shape of the scene surface(s). Such approaches, however, are sometimes expensive and/or technically complicated.

In accordance with one aspect of the present technology, a diverging, conical, beam of light is projected from a source, such as an LED, onto an object surface. If the object surface squarely faces the axis of the conical beam, the beam of light will project a perfect circle on the object surface. If the surface is inclined, the beam of light will result in an ellipse-shaped illumination pattern. The major axis of the ellipse indicates the direction of the surface tilt; the length ratio between the major and minor ellipse axes indicates the amount of surface tilt. The size of the ellipse indicates the distance to the surface.

Such a conical beam can be produced inexpensively by an LED behind a lens and/or a round hole. Such a pattern can be projected continuously. Alternatively, the pattern can be projected for just a brief instant (e.g., a tenth, thirtieth, or a hundredth of a second), and may be sensed by a camera whose exposure is synchronized to the illumination interval. The illumination may be of narrow spectrum (e.g., 660 nm, as by a red LED), or broader spectrum. The spectrum may fall in the visible range, or may be infrared or ultraviolet.

Such a pose detection arrangement may be integrated, for example, into a point-of-sale scanner of a supermarket checkout station. For instance, an infrared conical beam may be continuously projected from the scanner. An associated imaging sensor captures imagery of the resulting pattern. Such imagery is then sent to an image processor, which analyzes same to discern the parameters of the ellipse, and report the indicated direction, and amount, of object surface tilt—as well as ellipse size. The image processor can then use these parameters to counter-distort imagery captured by the POS camera (i.e., the same camera, or another—e.g., visible light camera), to virtually re-orient depiction of the object surface so that it appears to squarely face the camera, at a certain scale. Feature detection (e.g., barcode recognition, watermark decoding, fingerprint-based object recognition, etc.) is then performed using this counter-distorted imagery.

It will be recognized that this simple arrangement provides pose information useful in performing feature recognition, without the costs and complexity of prior art 3D modeling approaches.

More generally, imagery captured from an object can be processed based on contextual data that at least partially characterizes a condition of the object when the imagery was captured. The contextual data can be obtained directly by a sensor or can be derived by pre-processing the captured imagery. When the contextual data is known, a feature detection process can then be performed. By processing captured imagery based on contextual data, features can be quickly and accurately detected (e.g., as compared to conventional iterative feature detection processes) without relying on computationally expensive pose-invariant processes.

The foregoing and other features and advantages of the present technology will be more readily apparent from the following detailed description, which proceeds by reference to the accompanying drawings.

DETAILED DESCRIPTION

Embodiments of the technology are described more fully hereinafter with reference to the accompanying drawings, in which example embodiments are shown. These embodiments may, however, be implemented in many different forms and should not be construed as limited to the implementations explicitly set forth herein. In the following description, and unless otherwise specified, a range of values, when recited, is intended to include both the upper and lower limits of the range, as well as any sub-ranges therebetween. Unless otherwise expressly limited, the term "obtaining" is intended to indicate any of its ordinary meanings, such as acquiring, calculating, deriving, estimating, evaluating, receiving (e.g., from an external device), and/or retrieving (e.g., from a machine-readable medium).

Figure 1:
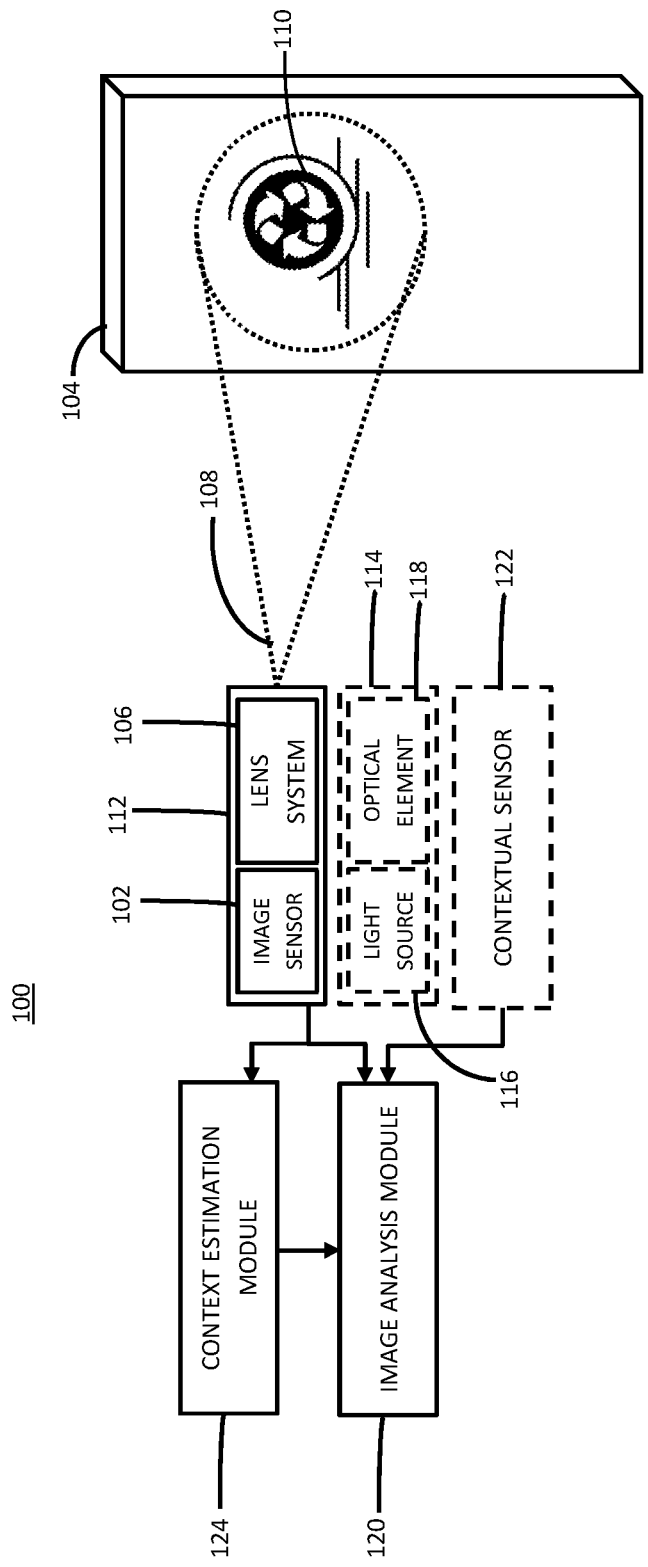
FIG. 1 illustrates a functional block diagram of a feature detection system according to some embodiments of the present technology.

Referring to FIG. 1, a feature detection system 100 according to one embodiment may include an image sensor 102 configured to capture an image (also referred to herein as a "query image") of a scene, including object 104, and output image data corresponding to the captured image. The image sensor 102 may be provided as a solid state or integrated circuit device having an array of sensor elements and associated analog and digital signal processing and exposure control circuitry. Examples include a complementary metal oxide semiconductor (CMOS) or a charge couple device (CCD) imaging sensor chip that is used in typical consumer grade digital still and video cameras, and in smartphones that have camera functionality.

The feature detection system 100 may further include an image lens system 106 optically coupled to the image sensor 102 that generally defines field of view 108 within which a query image (e.g., image 110) can be captured. The image lens system 106 typically includes a lens to focus light from the scene onto an image plane of the image sensor 102. As used herein, the term "lens" can refer to a single lens, a compound lens, a lens array (e.g., a microlens array), or any other system or assembly of lenses, and may include one or more different types of lenses such as a plano-convex lens, a plano-concave lens, a biconvex lens, a biconcave lens, a meniscus (e.g., positive or negative) lens, a Fresnel lens, a gradient-index (GRIN) lens, a cylindrical lens, a lenticular lens, a best form lens, etc. The image lens system 106 may be provided as a zoom or variable focus lens system, providing a range of focus and fields of view (e.g., between telephoto and wide-angle). The image lens system 106 may also include other features such as a variable or fixed aperture, and one or more light filters, all of which may be provided in accordance with conventional digital camera technology. Considered together, the image sensor 102 and the image lens system 106 constitute a camera 112.

Optionally, the feature detection system 100 further includes an illumination source 114 configured to project illumination light into the scene and onto objects within the scene, such as object 104. Typically, the illumination source 114 is located close to the image sensor 102 (e.g., within about 30 mm), but may be located farther from the image sensor 102 if desired. The illumination source 114 may produce illumination light in the form of one or more light pulses having a relatively short duration in a range from about 10 femtoseconds (fs) to a few hundredths of a second (e.g., while a query image is being captured), or as one or more pulses of light having a relatively long duration (e.g., to illuminate the scene while a series of query images are being captured). It will be appreciated that the illumination source 114 may be configured to illuminate the scene automatically (e.g., whenever the image sensor is actuated to capture a query image), automatically whenever ambient lighting levels are below a threshold level, when manually actuated by an operator of the feature detection system, or the like or a combination thereof. The illumination source 114 may be configured in any manner suitable to illuminate a scene with structured light or unstructured light. As used herein, "structured light" refers to any light pattern (e.g., ray, plane, grid, encoded light, etc.) to be projected under calibrated geometric conditions onto an object. Structured light can be created by, for example, projecting unstructured light (e.g., focused or unfocused) through a mask, a diffractive optical element, etc., or by scanning a laser in a predetermined pattern, or the like or a combination thereof.

Generally, the illumination source 114 includes one or more light sources, such as light source 116, which generates light. The light source may be provided as an electrically powered gas discharge tube (e.g., a xenon tube, a krypton tube, etc.), a light emitting diode (LED) (e.g., a semiconductor LED, a superluminescent LED, an organic LED (OLED), a quantum dot LED, etc.), a laser (e.g., a semiconductor laser diode, a fiber laser, a photonic crystal rod-type laser, etc.), or the like or a combination thereof. Light generated by any light source 116 can have one or more wavelengths in a range from 380 nm (or thereabout) to 750 nm (or thereabout), but may optionally include one or more wavelengths of infrared light (e.g., one or more wavelengths in the near-infrared range). Thus, light generated by the illumination source 114 can be characterized as infrared, red, green, blue, etc., or can be characterized as "white light." In one embodiment, white light generated by the light source 116 can be characterized as having the having a color temperature in a range from 2,700 K (or thereabout) to 7,000 K (or thereabout). To generate such white light, the illumination source 114 may include one or more suitable semiconductor LEDs such as any di-, tri- or tetrachromic white LEDs, phosphor-based LEDs, or the like or a combination thereof.

Optionally, the illumination source 114 includes one or more optical elements, such as optical element 118, optically coupled to the light source 116 to focus, concentrate, diverge, diffuse, scatter, direct, polarize, collimate, filter, diffract, refract or otherwise modify light produced by the light source(s). The optical element 118 may thus be provided as a reflector, a lens, a diffuser, diffractive optical element, or the like or a combination thereof. The optical element 118 can be provided as a static element, or may be adaptive or otherwise reconfigurable to adjust the manner in which light produced by a light source 116 is modified. Examples of adaptive optical elements include microelectromechanical system (MEMS) mirror arrays, electrowetting lenses, liquid crystal cells, etc. In one embodiment, the light source 116 and the optical element 118 may be positionally fixed relative to one another, or one or both of these elements can be moveable relative to the other (e.g., via mechanical coupling to an actuator such as a voice coil actuator, MEMS actuator, or the like).

The feature detection system 100 also includes an image analysis module 120 configured to perform a feature detection process on the image data output by the image sensor 102, to detect one or more features (e.g., watermarks, fingerprints, cryptographic hashes, barcodes, etc.) within the query image. In some embodiments, the manner in which the image analysis module 120 performs the feature detection process can be based upon factors describing the pose (e.g., scale, shear, etc.) of the surface of the object 104 being imaged relative to the image sensor 102. The feature detection process can be further based upon additional or alternative factors, such as those describing the planarity of the surface of the object 104 being imaged, the transparency (or opacity) of the surface of the object 104 being imaged, the reflectivity of the surface of the object 104 being imaged, object 104 or the like or a combination thereof. As used herein, the term "contextual data" includes information that describes one or any combination of the above-described factors. By processing the image data output by the image sensor 102 based on contextual data, features within the query image can be quickly and accurately detected (e.g., as compared to conventional iterative feature detection processes) without relying on computationally expensive pose-invariant processes.

In one embodiment, contextual data may be obtained from the output of one or more contextual sensors, such as contextual sensor 122. For example, contextual data relating to the distance between the surface of the object 104 being imaged and the image sensor 102, the contextual sensor 122 may be provided as a proximity sensor (e.g., active- or passive-type, ultrasonic, infrared, laser, radio frequency identification (RFID), near field communication (NFC), Bluetooth, etc.) employing simple a proximity-detection technique or other range-finding technique involving triangulation, use of structured light, time-of-flight, interferometry, coded aperture, or the like or a combination thereof. Exemplary proximity sensors suitable for use as a contextual sensor 122 typically have a measuring range from about 0 mm to 5 m, and may include sensors such as those sold by companies such as ARTEC, AVAGO, LEAP MOTION, MAXBOTIX, PRIMESENSE, OCCIPITAL and SHARP. Contextual data relating to the planarity of the surface of the object 104 being imaged, or relating to the degree and/or direction in which the surface of the object 104 is tilted relative to the image sensor 102, contextual sensor 122 may be provided as a 3D sensor employing techniques involving triangulation, structured light, time-of-flight, amplitude-modulated light, or the like or a combination thereof. Exemplary 3D sensors suitable for use as a contextual sensor 122 may include sensors such as those sold by companies such as ARTEC, LEAP MOTION, MAXBOTIX, OCCIPITAL and PRIMESENSE.

In another embodiment, contextual data may be obtained by processing the image data output by the image sensor 102. In such an embodiment, the feature detection system 100 may include a context estimation module 124 configured to process the image data to generate an estimate related to one or more of the aforementioned factors described as contextual data. The estimation is then output to the image analysis module 120 as contextual data. In some cases, contextual data obtained from the context estimation module 124 may be redundant to the contextual data that can be obtained from the contextual sensor 122 and, in those cases, the contextual sensor 122 may be omitted from the feature detection system 100. In other cases, contextual data obtained from the context estimation module 124 may be beneficially or desirably used to supplement the contextual data that can be obtained from the contextual sensor 122 and, in those cases, the context estimation module 124 and the contextual sensor 122 may be used in a complementary manner.

Some exemplary embodiments in which contextual data may be obtained by processing the image data output by the image sensor 102 are provided below. It will be appreciated that any of these embodiments may be practiced individually or in any beneficial, desirable or suitable combination. Also, it is to be recognized that the embodiments set forth below are illustrative only, and that the technology is not so limited.

In one embodiment, the context estimation module 124 estimates the distance between the image sensor 102 and the surface of the object 104 being imaged based on the degree of focus of visual information within the query image. Such focus-based distance estimation may be performed by any suitable or beneficial method (e.g., as discussed in U.S. Pat. No. 8,432,479, which is incorporated herein by reference in its entirety). In this embodiment, the query image can be captured while the object 104 either is or is not illuminated with illumination light.

In other embodiments, the query image is captured while the object is illuminated with illumination light. In such embodiment, the context estimation module 124 can provide contextual data by detecting the manner in which light produced by the illumination source 114 is reflected or absorbed by the imaged portion of the object 104. In one implementation, the context estimation module 124 can estimate the manner in which the surface of the object 104 being imaged is tilted relative to the image sensor 102 based the shape of a spot area illuminated on the object by the illumination source 114.

Figure 2:
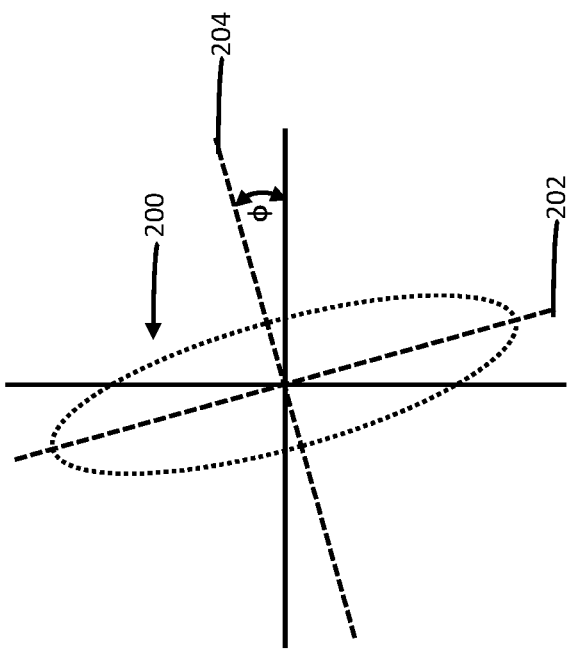
FIGS. 2 and 3 exemplarily illustrate a spot area that may be illuminated on an object by an illumination source of the feature detection system.
Figure 3:
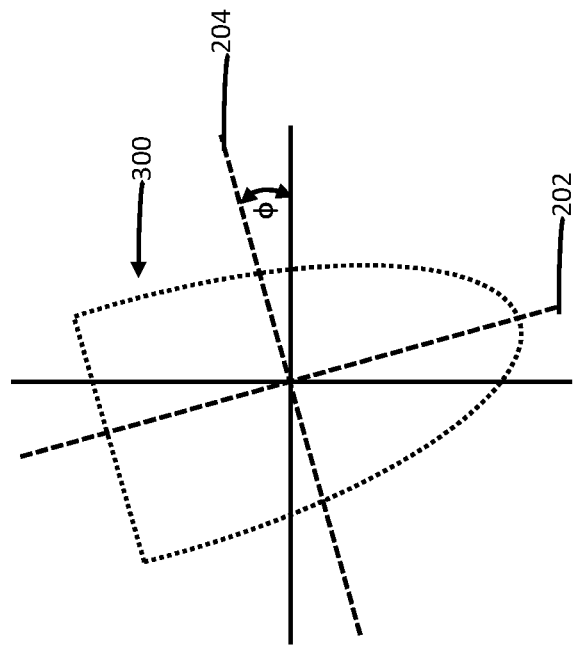

For example, the illumination source 114 can be configured such that the spatial intensity distribution of a spot area illuminated on the object 104 will have an essentially circular shape if the surface of the object 104 being imaged and an image plane of the image sensor 102 are parallel. However when the surface of the object 104 being imaged is tilted or oblique relative to the image plane of the image sensor 102, then the spot area will have a spatial intensity distribution having an elliptical shape (see, e.g., spot 200 shown in FIG. 2) or otherwise truncated elliptical shape (see, e.g., spot 300 shown in FIG. 3). In FIGS. 2 and 3, the dashed line representing the shape of the spots 200 and 300 corresponds to a region in the illuminated area of the object 104 where the brightness of light reflected by the object 104 drops below a threshold brightness level that is detectable at the image sensor 102. (Known blob detection and/or region growing methods can be employed to establish the extent of the projected spot.)

The degree (amount) of tilt between the surface of the object 104 being imaged and the image plane of the image sensor 102 can be estimated based on the ratio of the major axis 202 to the minor axis 204 of the illuminated spot. Likewise, the direction of the tilt can be estimated by measuring an angle (e.g., $\phi$) by which one axis of the spatial intensity distribution is rotated relative to another axis in a reference coordinate system. Further, the direction of tilt between the surface of the object 104 being imaged and the image plane of the image sensor 102 can be estimated by measuring the difference in brightness between two different regions of the spot area illuminated on the surface of the object 104. For example, when the lower-illustrated region of spot 200 is brighter than the upper-illustrated region of spot 200, then the context estimation module 124 can estimate that the lower portion of the imaged surface of the object 104 is closer to the illumination source 114 than the upper portion of the imaged surface of the object 104. In another example, the context estimation module 124 can estimate the lower-illustrated, non-truncated portion of spot 300 as closer to the camera 112 than the illumination source 114 than the upper-illustrated, truncated portion of spot 300.

Particular methods for assessing the ellipse parameters include the Hough transform (e.g., Bennett, A Method to Detect and Characterize Ellipses Using the Hough Transform, IEEE Trans. on Pattern Analysis and Machine Intelligence, 21:7, pp. 652-657 (1999)), and the method described in Chang, Detecting Ellipses by Bounding Boxes, Asian Journal of Health and Information Sciences, pp. 73-84 (2006).

The size of the ellipse (e.g., the length of the minor axis in image pixels) indicates the distance to the object surface. A lookup table can be employed for this purpose, based on data established in a calibration phase (e.g., by placing a planar surface at varying known distances from the light source, recording the length of the minor axis at each distance, and storing such data in the lookup table for later reference).

In some embodiments, multiple such circular patterns can be projected into a viewing space, and the distortion of each such pattern into an ellipse can be used to assess the local tilt of an object at respective positions in the space.

In another embodiment (e.g., in which the query image is captured while the object 104 is illuminated with illumination light), the context estimation module 124 can estimate the distance between the image sensor 102 and the object 104 based on the intensity of light produced by the illumination source 114 that is reflected back to the image sensor 102 from the object 104. In another embodiment (e.g., in which light produced by a light source 116 is focused or concentrated by one or more optical elements), the distance can be measured based on the degree of focus of a spot area illuminated on the object 104 by the illumination source 114 (e.g., in a similar manner as discussed in U.S. Pat. No. 8,432,479).

Figure 4A:
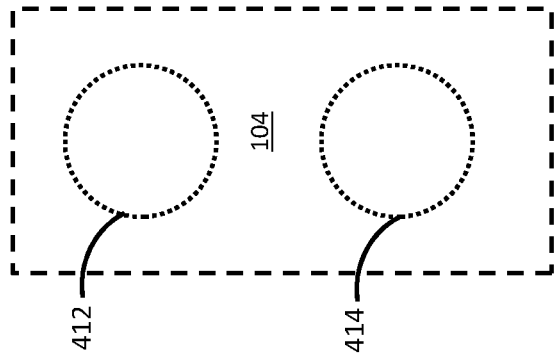
FIGS. 4A and 5A exemplarily illustrate spot areas illuminated on an object by embodiments of illumination sources illustrated in FIGS. 4 and 5, respectively.
Figure 4:
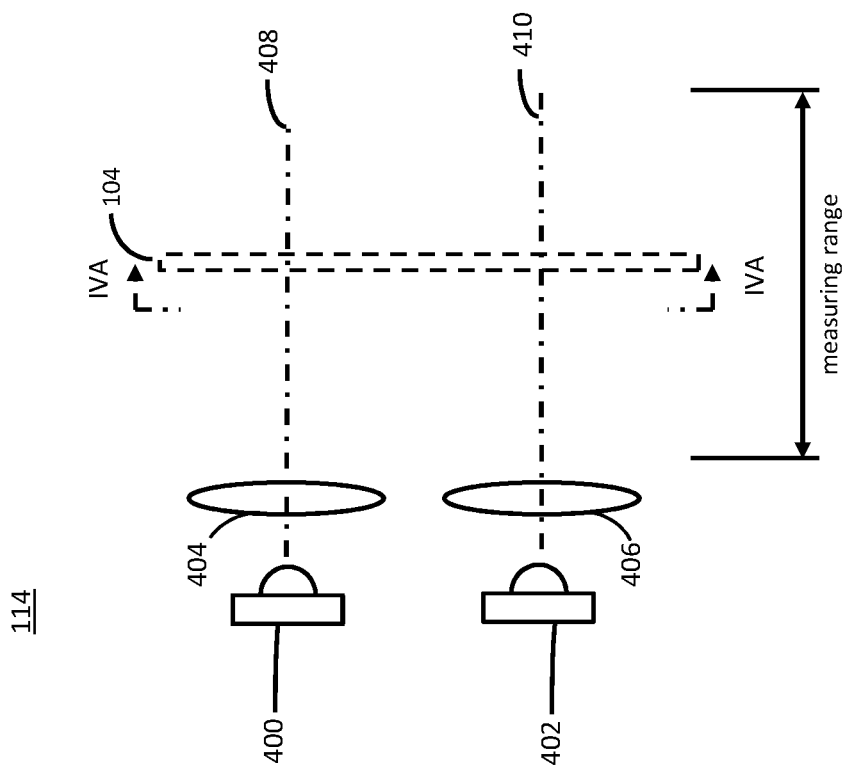
FIGS. 4 to 6 schematically illustrate various embodiments of an illumination source that may be incorporated within a feature detection system.

Referring to FIG. 4, an illumination source 114 according to one embodiment includes a plurality of light sources, such as first light source 400 and second light source 402, and a corresponding plurality of optical elements, such as first lens 404 and second lens 406.

Generally, each of the first light source 400 and the second light source 402 is provided as any suitable light source that can be configured to produce "white" light, but the color temperature of light produced by first light source 400 is different from (e.g., warmer than) the color temperature of light produced by second light source 402. It will be appreciated, however, that light generated by the first light source 400 may be of an entirely different color than light generated by the second light source 402 (e.g., the first light source 400 may generate red light whereas the second light source 402 may generate green light), that the first light source 400 may be of a different type than the second light source 402 (e.g., the first light source 400 may be an LED whereas the second light source 402 may be a flash tube), etc.

The first lens 404 is disposed in optical communication with the first light source 400 to thereby form a first illumination unit, and the second lens 406 is disposed in optical communication with the second light source 402 to thereby form a second illumination unit. One or more optical characteristics (e.g., focal length, depth of focus, etc.) of the first lens 404 may be the same as, or different from, one or more corresponding optical characteristics of the second lens 406. Generally, however, the lens of an illumination unit may have a focal length in a range from 3 mm to 200 mm (or thereabout). It will nevertheless be appreciated, however, that the focal length can be greater than 200 mm.

Depending on the optical characteristics of a lens, and the position and orientation of the lens relative to an associated light source, any of the first lens 404 or the second lens 406 can modify (e.g., focus, concentrate, collimate, spread or diverge) light produced by its respective light source, thereby producing illumination light that is ultimately projected into the scene along an optical axis, and onto the object 104. Thus, first illumination light can be projected by the first illumination unit along the first optical axis 408 and illuminate a first spot area (e.g., first spot area 412 as shown in FIG. 4A) on the object 104. Similarly, second illumination light can be projected by the second illumination unit along the second optical axis 410 and illuminate a second spot area (e.g., second spot area 414 as shown in FIG. 4A) on the object 104.

Although the first optical axis 408 is illustrated as being parallel to the second optical axis 410, it will be appreciated that the first and second illumination units may be configured in any manner such that the first optical axis 408 either diverges from the second optical axis 410 (e.g., along a direction away from the illumination source 114) or converges with the second optical axis 410 (e.g., at some point distant from the illumination source 114). Although FIG. 4A illustrates the first spot area 412 and the and second spot area 414 as being spaced apart from each other, the first spot area 412 and the and second spot area 414 may touch or overlap (e.g., depending on the position of the object 104 within the measuring range, the configuration of the illumination source 114, etc.).

Constructed as exemplarily described above, the first and second illumination units may be driven (e.g., simultaneously) to illuminate the object 104 with illumination light while a query image of the object 104 is captured. If the object 104 is located within the measuring range, then one or more characteristics (e.g., brightness, size, location on the object 104, etc.) of the first spot area 412 can be at least somewhat discernible from corresponding characteristics of the second spot area 414. The measuring range can be predetermined or otherwise calibrated in correspondence with one or more factors such as the position and/or orientation of the illumination units relative to one another, the position and/or orientation of the first optical axis 408 relative to the second optical axis 410, the intensity of illumination light produced by each illumination unit, the optical properties of the first lens 404 and the second lens 406, the spatial intensity distribution of illumination light produced by the first and second illumination units, and the like. In one embodiment, the illumination source 114 is configured such that the measuring range has a depth of at least 10 mm (or thereabout). For example, the measuring range may have a depth in a range from 10 mm to 300 mm (or thereabout). In one embodiment, the illumination source 114 is configured such that the measuring range has a depth of at least 10 mm (or thereabout), wherein the maximum distance the measuring range can be from the image sensor 102 (hereinafter referred to as a "working distance") is 300 mm (or thereabout).

Upon receiving image data from the image sensor 102, the context estimation module 124 can process the image data to determine whether or not a characteristic of the first spot area 412 can be discerned from a corresponding characteristic of the second spot area 414. If the characteristics can be sufficiently discerned, then the context estimation module 124 outputs contextual data indicating that the object 104 is within the measuring range of the feature detection system 100. The image analysis module 120 can then perform a feature detection process on the image data by reference to this contextual data.

In one embodiment, the illumination source 114 can be configured in any manner as exemplarily described above to project the first and second illumination light such that one or more relationships between one or more characteristics of the first and second spot areas changes as a function of the position of the object 104 within the measuring range. For example, the focal length of first lens 404 may be different from the focal length of the second lens 406 and, as a result, the brightness of first spot area 412 relative to the brightness of the second spot area 414 may change as the position of the object 104 within the measuring range changes. In another example, the size of the first spot area 412 relative to the size of the second spot area 414 may change as the position of the object 104 within the measuring range changes due to different focal lengths of the first and second lenses. In yet another example, the first optical axis 408 may not be parallel with the second optical axis 410 and, as a result, the location of the first spot area on the object 104 relative to the location of the second spot area on the object 104 (e.g., as measured by a center-to-center distance between the first and second spot areas) may change as the position of the object 104 within the measuring range changes. Upon receiving image data from the image sensor 102, the context estimation module 124 can process the image data to discern one or more of the aforementioned position-dependent relationships and, thereafter, output contextual data indicating that the object 104 is at a corresponding position within the measuring range (or is within a corresponding, relatively narrow, sub-range of the measuring range). The image analysis module 120 can then perform a feature detection process on the image data based on this contextual data.

Figure 5A:
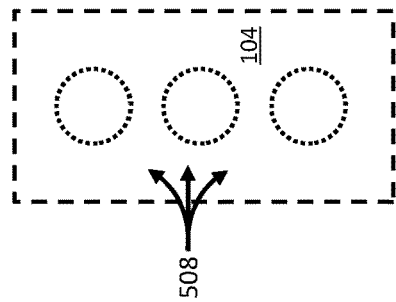
Figure 5:
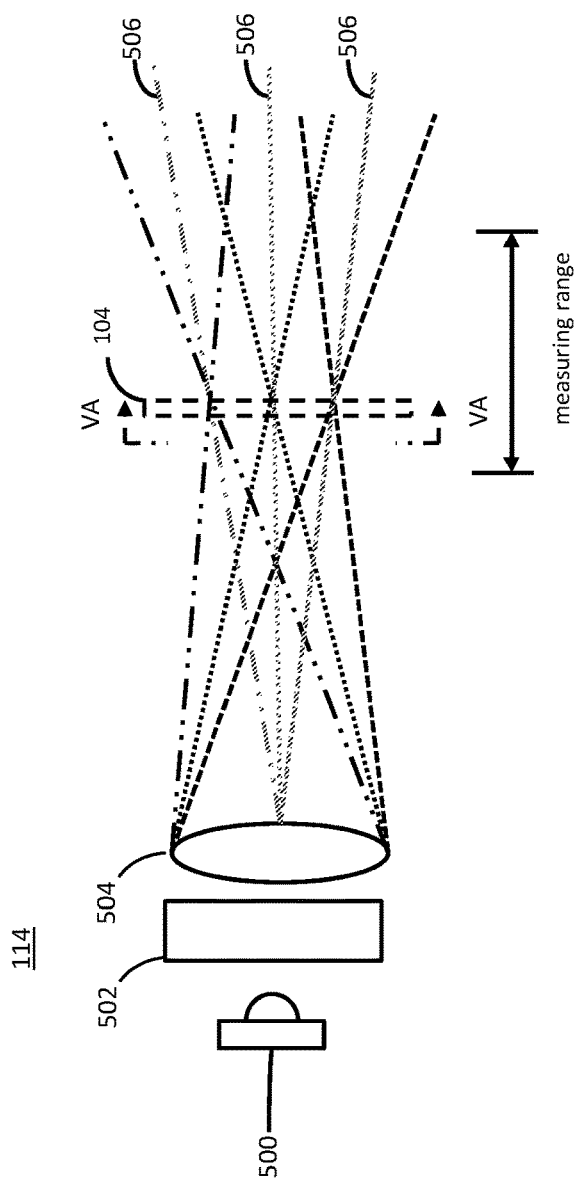

Referring to FIG. 5, an illumination source 114 according to another embodiment may include a light source 500 configured to produce light, a diffractive optical element (DOE) 502 configured to diffract light produced by the light source 500, and a lens 504 configured to concentrate or focus the diffracted light thereby producing diffracted beams of illumination light that can ultimately be projected into the scene along a plurality of optical axes 506, and onto the object 104. Thus, illumination light can be projected by the illumination source 114 along the optical axes 506 and illuminate a corresponding plurality of spot areas (e.g., spot areas 508 as shown in FIG. 5A) on the object 104.

Constructed as exemplarily described above, the illumination source 114 may be driven to illuminate the object 104 with illumination light while a query image of the object 104 is captured. If the object 104 is located within the measuring range, then one or more characteristics (e.g., brightness, size, location on the object 104, etc.) of at least one of the spot areas 508 can be adequately discernible from corresponding characteristics of another of the spot areas 508, and the context estimation module 124 can process image data output by the image sensor 102 and output contextual data as discussed above with respect to FIGS. 4 and 4A. In another embodiment, the context estimation module 124 can output contextual data based upon a change in one or more position-dependent relationships exhibited among the spot areas 508 (e.g., as discussed above with respect to FIGS. 4 and 4A). As illustrated in FIG. 5, the diffracted beams tend to mix together beyond the measuring range. As a result, relatively distant objects within a scene (e.g., objects located greater than 250 mm away from the image sensor 102) are illuminated by light that has a relatively uniform spatial intensity distribution.

Figure 6:
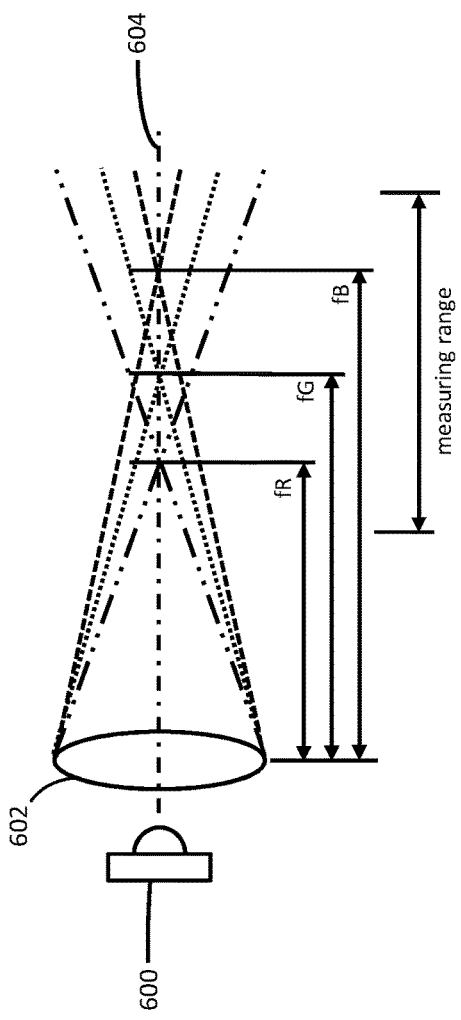

Referring to FIG. 6, an illumination source 114 according to another embodiment may include a light source 600 configured to produce white light and a chromatic lens 602 configured to cause longitudinal chromatic aberration. Thus, the lens 602 is configured to focus different wavelengths of light produced by the light source 600 at different focal lengths (e.g., focusing red light at focal length fR, focusing green light at focal length fG, focusing blue light at focal length fB, etc.) to thereby produce unstructured illumination light that is ultimately projected into the scene along an optical axis 604. The lens 602 is configured such that the spectral components of the illumination light produced are spatially dispersed along a region of the optical axis 604. The extent of this spectral dispersion along the optical axis 604 defines the measuring range of the feature detection system 100. In one embodiment, the measuring range has a depth of up to 30 mm (or thereabout) and a working distance of up to 75 mm (or thereabout). Beyond the measuring range, the spectral components of the illumination light tend to mix together such that relatively distant objects within a scene (e.g., objects located greater than 250 mm away from the image sensor 102) are illuminated by light that is, at most, minimally spectrally dispersed. Exemplary lenses suitable for use as lens 602 may include lenses such as those found in confocal sensors of the type manufactured by companies such as MICRO-EPSILON and CYBER TECHNOLOGIES. In other embodiments, the lens 602 may be provided in any suitable or beneficial optical configuration, e.g., as described in U.S. Patent App. Pub. Nos. 2012/0200726, 2012/0307133, or 2008/0239088, U.S. Pat. No. 8,212,997, WO 2012/0953522, or Cossiart et al., "Spectral Focal Sweep: Extended Depth of Field from Chromatic Aberrations", IEEE International Conference on Computational Photography (ICCP), March 2010, each of which is incorporated herein by reference in its entirety.

Constructed as exemplarily described above, the light source 600 may be driven to illuminate the object 104 with illumination light while a query image of the object 104 is captured. If the object 104 is located within the measuring range of the image sensor 102, then illumination light produced by the lens 602 will be longitudinally chromatically aberrated, and one or more characteristics (e.g., color distribution, brightness, shape, size, degree of focus, etc.) of a resultant spot area illuminated on the object 104 by the chromatically aberrated illumination light can be discerned. Upon receiving image data from the image sensor 102, the context estimation module 124 can process the image data to discern one or more of these depth-dependent relationships by any suitable method (e.g., according to any method described in U.S. Patent App. Pub. Nos. 2012/0200726, 2012/0307133, or 2008/0239088, U.S. Pat. No. 8,212,997, WO 2012/0953522, or "Spectral Focal Sweep: Extended Depth of Field from Chromatic Aberrations"). Thereafter, the context estimation module 124 can output contextual data indicating that the object 104 is at a corresponding depth within the measuring range (or is within a corresponding, relatively narrow, sub-range of the measuring range). The image analysis module 120 can perform a feature detection process on the image data based on this contextual data.

Figure 8:
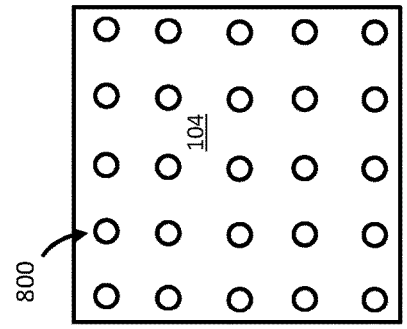
FIGS. 7 and 8 exemplarily illustrate spot areas illuminated on an object by still other embodiments of illumination sources.
Figure 7:
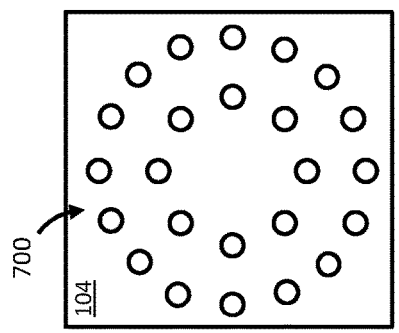

In the embodiment exemplarily described above with respect to FIG. 6, the illumination source 114 is configured to produce unstructured, chromatically aberrated light. In another embodiment, however, the illumination source 114 may be configured to produce structured, chromatically aberrated light that can be projected into the scene and onto the object 104. For example, the light source 600 may be provided as a superluminescent LED, a supercontinuum generation laser, etc., configured to produce white light exhibiting a relatively high spatial coherence, and a mask (not shown) can be inserted between the light source 600 and the lens 602. The mask can create any suitable pattern of dots (e.g., a set of spots arranged in a pattern 700 of concentric circles, as shown in FIG. 7, in a grid-like pattern 800 as shown in FIG. 8, etc.) which, after passing through lens 602, can be projected onto the object 104. Thus, the distance between the imaged surface of the object 104 and the feature detection system 100 can be estimated based on the color of dots projected onto the object 104. Similarly, the degree of planarity of the surface of the object 104 being imaged and/or tilt of the surface of the object 104 being imaged relative to the image sensor 102 can be estimated based on any difference in color among dots projected onto the object 104.

As discussed above, the image analysis module 120 is configured to perform a feature detection process on image data output by the image sensor 102 based on contextual data (e.g., as received from one or both of the contextual sensor 122 and from the context estimation module 124). In one embodiment, the image analysis module 120 performs the feature detection process by first selecting one or more of several predetermined feature detection processes, operations or parameters of any of these (e.g., stored in a look-up table) that is associated with a factor (or set of factors) that most closely corresponds to a factor (or set of factors) described by the contextual data. The image data is then processed according to the selected feature detection process(es), function(s) and/or parameter(s). In another embodiment, the image analysis module 120 performs the feature detection process by first modifying the image data such that the factor (or set of factors) described by the contextual data conforms a reference factor (or set of reference factors) associated with a predetermined feature detection process. The modified image data is then processed with the predetermined feature detection process.

After the image analysis module 120 has detected one or more features within the query image, one or more information extraction and/or decoding processes can proceed (e.g., locally, at the image analysis module, at a remote sever, or a combination thereof). Information extracted and/or decoded is then transmitted to a database, to search for a matching fingerprint or to perform some other data lookup (e.g., to identify data carriers encoded via one- or two-dimensional barcode, digital watermark, dataglyph, etc.). The results of the database search provide content or object identification (a number or some other form of index for metadata lookup), which in turn, enables look up of metadata corresponding to the content identification in one or more metadata databases. The metadata can then be returned to a device (not shown) for output (e.g., visual, audio, haptic, or the like or any combination thereof) or for further processing. In one embodiment, metadata is returned to the device that requested the database search. In another embodiment, the metadata is returned to some other device (e.g., a user's home device, or a monitoring system's data collection database in which the metadata and recognition events are aggregated and compiled for electronic report generation).

It is envisioned that the above-described processes, systems and system components described herein can be implemented in a variety of computing environments and devices. It is further contemplated that the processes, systems and system components described herein can be implemented within individual devices or across multiple devices. For example, the aforementioned camera, illumination source 114 (and, optionally, contextual sensor 122) may be incorporated within any electronic device capable of performing an image capture function, such as a camera-equipped mobile phone, media player, smartphone, tablet computer, laptop computer, desktop computer, or any other portable or wearable electronic device with an integrated camera function (e.g., a wrist-mountable smartwatch, such as the GALAXY GEAR sold by SAMSUNG; a head-mountable electronic device such as GLASS promoted by GOOGLE, a point of sale (POS) scanner such as those used in retail settings, and the like).

Figure 9:
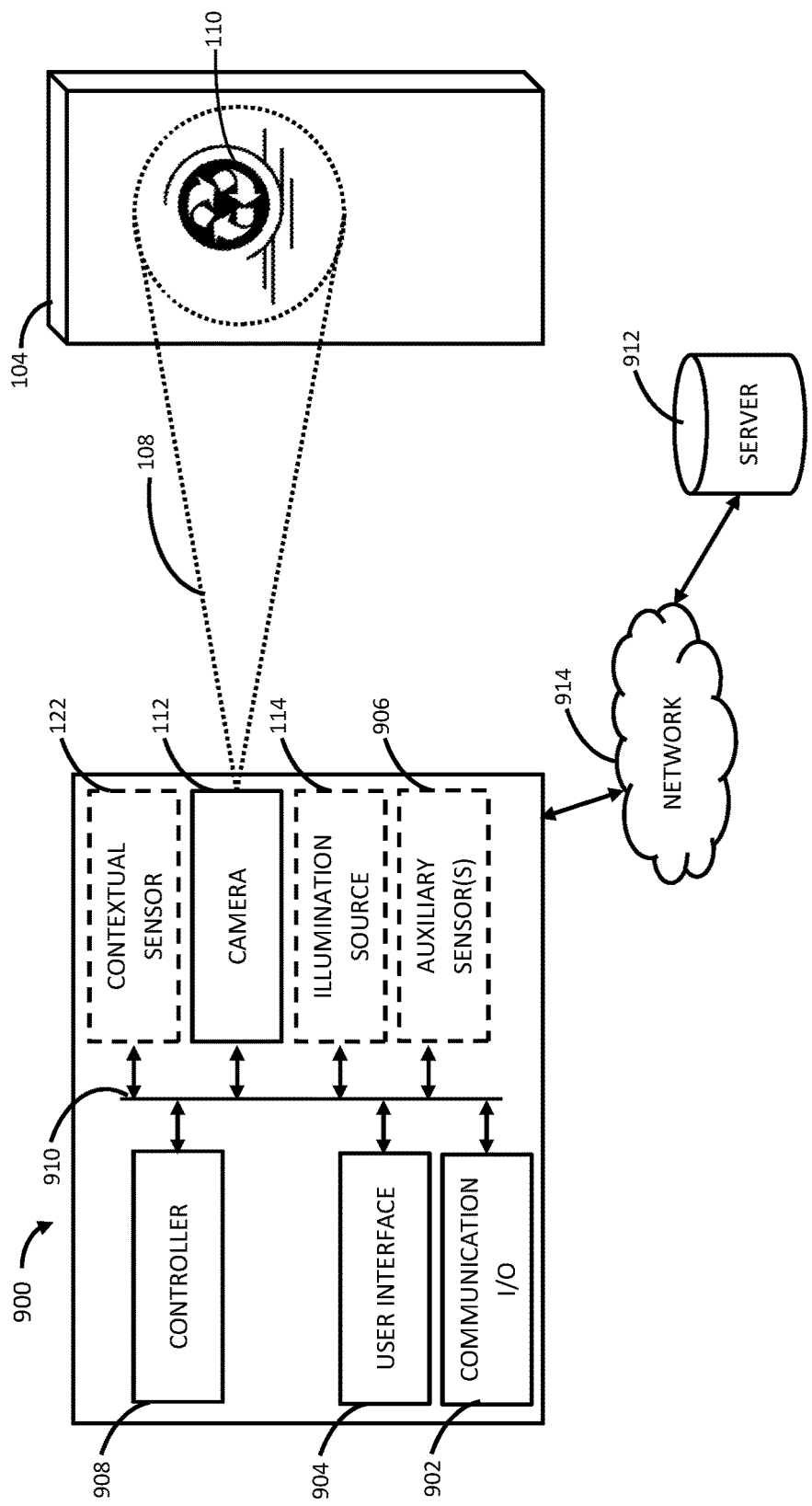
FIG. 9 schematically illustrates one embodiment of an electronic device that may incorporate a feature detection system according to the numerous embodiments exemplarily described herein.

As shown in FIG. 9, an electronic device 900 may include the aforementioned camera 112, one or both of the aforementioned illumination source 114 and contextual sensor 122, as well as a communication input/output (I/O) 902, a user interface 904, and, optionally, one or more auxiliary sensors 906, operatively coupled to a controller 908 via communications bus 910.

Generally, the controller 908 can include operating logic (not shown) to implement the processes, modules and system components detailed herein. The operating logic may be in the form of dedicated hardware (e.g. a hardwired state machine), a processor configured to execute software instructions stored on non-transitory computer-readable media (e.g., non-volatile electronic computer memory such as EPROM, EEPROM, Flash memory, etc., magnetic storage device such as magnetic tape, floppy drive, hard drive, MRAM, etc., optical storage device such as CD-ROM, DVD, etc.), or any other different form as would occur to those of ordinary skill in the art. Thus, operating logic may include programmable logic devices, FPGAs (e.g., Xilinx Virtex series devices), FPOAs (e.g., PicoChip brand devices), application-specific circuits including digital, analog and mixed analog/digital circuitry, or a hybrid combination of any of these types. In one embodiment, controller 908 includes one or more programmable microcontrollers, microprocessors, graphics processing units (GPUs, such as the nVidia Tegra APX 2600, etc.), digital signal processors (e.g., the Texas Instruments TMS320 series devices), or any other processors (e.g., the ARM series of CPUs, using a 32-bit RISC architecture developed by Arm, Ltd.) that can execute stored software instructions. Software instructions for implementing the detailed functionality can be readily authored by artisans, from the descriptions provided herein, e.g., written in C, C++, Visual Basic, Java, Python, Tel, Perl, Scheme, Ruby, etc. In the illustrated embodiment, operating logic associated with the controller 908 is co-located with the electronic device 900 (e.g., the controller 908 is physically located within a housing of the electronic device 900). In another embodiment, portions of the operating logic associated with the controller 908 are distributed across one or more external devices that are not physically located within the housing of the electronic device 900. While the illustrated embodiment describes the electronic device 900 as including a single controller 908, it will be appreciated that the electronic device 900 may include multiple controllers 908. It will further be appreciated that some or all of the controllers configured to implement the processes, modules and system components detailed herein may be physically remote from the electronic device 900 (i.e., not contained within the housing of the electronic device 900). Thus, implementation of the processes, modules and system components, where appropriate, can be distributed among the controllers and/or made parallel across controller within the electronic device 900 or across a network of other devices (e.g., via communications I/O 902). References to "processors" or "modules" should be understood to refer to functionality, rather than requiring a particular form of implementation.

The communication (I/O) 902 may support wireless communications, wired communications (e.g., Ethernet, etc.), or both. In one embodiment, the communication I/O 902 can include RF circuitry connected to an antenna, which enables wireless data to be transmitted and received (e.g., to and/or from a remote server 912 via network 914). The RF circuitry and associated antenna may be designed in accordance with any suitable wireless communications protocol such as GSM, CDMA, W-CDMA, CDMA2000, TDMA, EV-DO, HSDPA, WiFi, WiMax, or Bluetooth, and/or wired medium such as through an Ethernet local area network, a T-1 internet connection, etc.

The user interface 904 may include one or more devices that enables a user to initiate or control an operation supported by the electronic device 900, or otherwise interact with the electronic device 900. Accordingly, the user interface 904 may include one or more input devices (e.g., a physical button or switch, keypad, keyboard, mouse, touchscreen or other gesture sensor, microphone, camera, etc.) that enable a user to manipulate the electronic device 900. The user interface 904 may further include one or more output devices (e.g., a speaker, TFT LCD or OLED display screen, vibration motor, etc.) that allow the electronic device 900 to indicate, for example, the effects of the user's manipulation. In one embodiment, an image captured by the camera 112 may be presented to the user via the display screen (e.g., before, during and/or after the image is captured).

One or more of the aforementioned processes involving feature detection, data extraction, data decoding, database entry, database search and retrieval can be performed on one or more devices, which may be distinct or overlap. For example, and with reference to FIG. 9, the feature detection process (and any data extraction or decoding processes) are performed at the electronic device 900 whereas processes such as database entry, database search and retrieval are remotely performed (e.g., at one or more servers such as server 912) via network 914.

The above processing of content signals includes transforming of these signals in various physical forms. Images and video (forms of electromagnetic waves traveling through physical space and depicting physical objects) may be captured from physical objects using cameras or other capture equipment, or generated by a computing device. While these signals are typically processed in electronic and digital form to implement the components and processes described above, they may also be captured, processed, transferred and stored in other physical forms, including electronic, optical, magnetic and electromagnetic wave forms. The content signals are transformed during processing to compute signatures, including various data structure representations of the signatures as explained above. In turn, the data structure signals in memory are transformed for manipulation during searching, sorting, reading, writing and retrieval. The signals are also transformed for capture, transfer, storage, and output via display or audio transducer (e.g., speakers).

Typically, devices for practicing the detailed methods include operating system software that provides interfaces to hardware devices and general purpose functions, and also include application software that can be selectively invoked to perform particular tasks desired by a user. Known browser software, communications software, and media processing software can be adapted for uses detailed herein. Some embodiments may be implemented as embedded systems—a special purpose computer system in which the operating system software and the application software is indistinguishable to the user (e.g., as is commonly the case in basic cell phones). The functionality detailed in this specification can be implemented in operating system software, application software and/or as embedded system software.

Different of the functionality can be implemented on different devices. For example, in a system in which a cell phone communicates with a server at a remote service provider, different tasks can be performed exclusively by one device or the other, or execution can be distributed between the devices. For example, extraction of signatures from a test image on a cell phone, and searching of a database for corresponding reference images on a remote server, is one architecture, but there are many others. For example, information about reference images may be stored on the cell phone—allowing the cell phone to capture a test image, generate signatures, and compare against stored signature data structures for reference images—all without reliance on external devices. Thus, it should be understood that description of an operation as being performed by a particular device (e.g., a cell phone) is not limiting but exemplary; performance of the operation by another device (e.g., a remote server), or shared between devices, is also expressly contemplated. (Moreover, more than two devices may commonly be employed. E.g., a service provider may refer some tasks, functions or operations, to servers dedicated to such tasks.) In like fashion, data can be stored anywhere: local device, remote device, in the cloud, distributed, etc. Operations need not be performed exclusively by specifically-identifiable hardware. Rather, some operations can be referred out to other services (e.g., cloud computing), which attend to their execution by still further, generally anonymous, systems. Such distributed systems can be large scale (e.g., involving computing resources around the globe), or local (e.g., as when a portable device identifies nearby devices through Bluetooth communication, and involves one or more of the nearby devices in an operation.)

Concluding Remarks

Having described and illustrated the principles of the technology with reference to specific implementations, it will be recognized that the technology can be implemented in many other, different, forms.

For example, while integration into a point-of-sale scanning system was particularly detailed, the technology can advantageously be employed elsewhere, such as in a mobile phone.

Likewise, while a conical beam of light was discussed in one embodiment, a beam of any other known cross-section (when projected onto a perpendicularly-facing surface) can alternatively be used. For example, by a lens and/or mask arrangement, a light beam having a rectangular cross section, with a 2:1 aspect ratio, can be projected. Distortion of this shape into a different quadrilateral/trapezoid/parallelogram shape indicates the orientation of the surface onto which it was projected.

Still further, while planar surfaces were particularly contemplated (e.g., the face of a cereal box presented to a point-of-sale scanner), the same principles can also be employed with curved surfaces (e.g., the face of a soup can presented to such a scanner). When a circular pattern is projected onto such a cylindrical object, and the axis of the cylinder is perpendicular to the axis of the light beam, the circular pattern will be elongated and have 2 perpendicular axes of symmetry—revealing the orientation of the cylinder's axis. The extent/form of the elongation reveals the scale of the curvature. If the cylinder axis is not perpendicular to the light beam, the resulting pattern will have just one axis of symmetry (along the cylinder axis).

As discussed above, image data can be processed to estimate the distance between the surface of the object 104 being imaged and the image sensor 102. This distance data can be desirably or beneficially combined or augmented with additional data generated by a mobile implementation of the electronic device 904 (e.g., data captured from one or more auxiliary sensors 906 such as a 3-axis accelerometer, gyroscope, magnetometer, pressure sensor, microphone (e.g., of the capacitive type, optical type, etc.), particle velocity sensor, global positioning system (GPS) sensor, or the like or a combination thereof) to generate a three-dimensional model of the object 104 based on (e.g., using a structure from motion (SfM) technique). Further, techniques of generating and interpreting contextual data described herein may be applied enhancing an augmented reality experience (e.g., as exemplarily described in U.S. Ser. No. 13/789,126, now published as 20140119593, which is incorporated herein by reference in its entirety).

The methods, processes, and systems described above may be implemented in hardware, software or a combination of hardware and software. For example, the signal processing operations described above may be implemented as instructions stored in a memory and executed in a programmable computer (including both software and firmware instructions), implemented as digital logic circuitry in a special purpose digital circuit, or combination of instructions executed in one or more processors and digital logic circuit modules. The methods and processes described above may be implemented in programs executed from a system's memory (a computer readable medium, such as an electronic, optical or magnetic storage device). The methods, instructions and circuitry operate on electronic signals, or signals in other electromagnetic forms. These signals further represent physical signals like image signals (e.g., light waves in the visible spectrum) captured in image sensors. These electromagnetic signal representations are transformed to different states as detailed above to detect signal attributes, perform pattern recognition and matching, encode and decode digital data signals, calculate relative attributes of source signals from different sources, etc. The above methods, instructions, and hardware operate on reference and suspect signal components. As signals can be represented as a sum of signal components formed by projecting the signal onto basis functions, the above methods generally apply to a variety of signal types. The Fourier transform, for example, represents a signal as a sum of the signal's projections onto a set of basis functions.

The technology detailed in the present disclosure is related to that detailed in applicant's publications 20140052555 and 20140071268.

To provide a comprehensive disclosure, while complying with the statutory requirement of conciseness, applicant incorporates-by-reference each of the documents referenced herein. (Such materials are incorporated in their entireties, even if cited above in connection with specific of their teachings.) Applicant contemplates and intends that the presently-described arrangements be incorporated into the methods and systems detailed in the incorporated documents, and vice versa.

What is claimed is:

1. A point of sale terminal including a processor, an illumination system and a camera system;
   the illumination system being adapted to project a conical beam of light onto a surface of an object presented for checkout at said terminal; and
   the processor being adapted to discern one or more parameter(s) of a resultant ellipse depicted in imagery captured by the camera system, and employ said parameter(s) in performing an object identification operation on the imagery.

2. The point of sale terminal of claim 1 in which:
   the illumination system includes a chromatic lens adapted to cause longitudinal chromatic aberration; and
   the processor is adapted to (a) discern, from a color of the elliptical pattern projected onto the object surface, distance information about a distance between the illumination system and the object surface, and to (b) use such distance information in performing said object identification operation.

3. The terminal of claim 1 in which the processor is adapted to employ said parameter(s) in performing a barcode, watermark, or fingerprint-based identification operation on the imagery.

4. The terminal of claim 1 in which the processor is adapted to discern a ratio between lengths of major and minor axes of said ellipse.

5. The terminal of claim 1 in which the processor is adapted to discern a distance to the object surface by reference to a color of the beam projected on the surface.

6. The point of sale terminal of claim 1 in which the processor is configured to:
   determine direction and length data for a major axis of the ellipse;
   determine length data for a minor axis of the ellipse;
   from said determined direction and length data, estimate a pose of the surface; and
   employ said estimated pose in performing the object identification operation.

7. The point of sale terminal of claim 6 in which the processor is configured to employ said estimated pose in virtually-distorting the captured imagery to produce a view of the surface as if squarely facing an axis of the projected beam of light, as part of performing said object identification operation.

8. The point of sale terminal of claim 6 in which the processor is configured to employ said estimated pose in virtually-distorting the captured imagery to produce a view of the surface as if squarely facing an axis of the projected beam of light, and to perform a digital watermark decoding operation on the virtually-distorted imagery.

9. The point of sale terminal of claim 6 in which the processor is configured to employ said estimated pose in virtually-distorting the captured imagery to produce a view of the surface as if squarely facing an axis of the projected beam of light, and to perform a fingerprint-based recognition operation on the virtually-distorted imagery.

10. The point of sale terminal of claim 6 in which the processor is configured to employ said estimated pose in performing a digital watermark decoding operation on the captured imagery.

11. The point of sale terminal of claim 6 in which said estimated pose includes at least one of: a degree of tilt of the surface, a direction of tilt of the surface, and a distance to the surface.

12. The point of sale terminal of claim 6 in which the object has a cylindrical shape, and the estimated pose includes an estimated orientation of an axis of said cylindrical shape.

13. The point of sale terminal of claim 1 in which the illumination system is adapted to project plural conical beams of light onto the surface of the object, and the processor is adapted to discern one or more parameter(s) of resultant ellipses depicted in imagery captured by the camera system and employ said parameter(s) in performing the object identification operation on the imagery.

14. A mobile phone including a processor, an illumination system and a camera;
the illumination system being adapted to project a conical beam of light onto a surface of an object; and
the processor being adapted to discern one or more parameter(s) of a resultant ellipse depicted in imagery captured by the camera, and to employ said parameter(s) in extracting object-identifying information from the imagery.

15. The mobile phone of claim 14 in which the processor is configured to:
determine direction and length data for a major axis of the ellipse;
determine length data for a minor axis of the ellipse;
from said determined direction and length data, estimate a pose of the surface; and
employ said estimated pose in extracting object-identifying information from the imagery.

16. The mobile phone of claim 15 in which the processor is configured to employ said estimated pose in virtually-distorting the captured imagery to produce a view of the surface as if squarely facing an axis of the projected beam of light, as part of extracting object-identifying information from the imagery.

17. The mobile phone of claim 15 in which the processor is configured to employ said estimated pose in virtually-distorting the captured imagery to produce a view of the surface as if squarely facing an axis of the projected beam of light, and to perform a digital watermark decoding operation on the virtually-distorted imagery.

18. The mobile phone of claim 15 in which the processor is configured to employ said estimated pose in virtually-distorting the captured imagery to produce a view of the surface as if squarely facing an axis of the projected beam of light, and to perform a fingerprint-based recognition operation on the virtually-distorted imagery.

19. The mobile phone of claim 15 in which the processor is configured to employ said estimated pose in performing a digital watermark decoding operation on the captured imagery.

20. The mobile phone of claim 15 in which said estimated pose includes at least one of: a degree of tilt of the surface, a direction of tilt of the surface, and a distance to the surface.

21. The mobile phone of claim 15 in which the object has a cylindrical shape, and the estimated pose includes an estimated orientation of an axis of said cylindrical shape.

22. The mobile phone of claim 14 in which the illumination system is adapted to project plural conical beams of light onto the surface of the object, and the processor is adapted to discern one or more parameter(s) of resultant ellipses depicted in imagery captured by the camera system and employ said parameter(s) in extracting object-identifying information from the imagery.

23. An apparatus comprising:
a camera;
first means for projecting a conical beam of light onto a surface of an object; and
second means for discerning one or more parameter(s) of a resultant ellipse depicted in imagery captured by the camera, and for employing said parameter(s) in extracting object-identifying information from the imagery.

* * * * *